(12) United States Patent
Pedersen

(10) Patent No.: US 9,850,879 B2
(45) Date of Patent: Dec. 26, 2017

(54) ASSEMBLY WITH HANDLING UNIT FOR MOVING A WIND TURBINE COMPONENT, SUCH AS A WIND TURBINE HUB, FROM A TRANSPORTATION POSITION TO A WIND TURBINE ASSEMBLY POSITION IN OR ON THE NACELLE, THE MAIN SHAFT OR THE HUB

(71) Applicant: Vestas Wind Systems A/S, Aarhus N. (DK)

(72) Inventor: Gunnar Kamp Storgaard Pedersen, Videbaek (DK)

(73) Assignee: Vestas Wind Systems A/S, Aarhus N. (DK)

( * ) Notice: Subject to any disclaimer, the term of this patent is extended or adjusted under 35 U.S.C. 154(b) by 233 days.

(21) Appl. No.: 15/007,680

(22) Filed: Jan. 27, 2016

(65) Prior Publication Data
US 2016/0138562 A1 May 19, 2016

Related U.S. Application Data

(62) Division of application No. 13/782,422, filed on Mar. 1, 2013, now Pat. No. 9,296,592, which is a division
(Continued)

(30) Foreign Application Priority Data

Jan. 24, 2007 (DK) ................................ 2007 00106

(51) Int. Cl.
*B66C 1/10* (2006.01)
*F03D 1/00* (2006.01)
(Continued)

(52) U.S. Cl.
CPC .............. *F03D 1/001* (2013.01); *B66C 1/108* (2013.01); *F03D 1/0658* (2013.01); *F03D 13/10* (2016.05);
(Continued)

(58) Field of Classification Search
CPC ...................................................... B66C 1/108
(Continued)

(56) References Cited

U.S. PATENT DOCUMENTS

| | | | | |
|---|---|---|---|---|
| 6,888,264 B1 * | 5/2005 | Willis | ..................... | F03D 13/20 290/44 |
| 2001/0038207 A1 * | 11/2001 | Willis | ..................... | F03D 13/20 290/55 |

(Continued)

*Primary Examiner* — Jonathan Snelting
(74) *Attorney, Agent, or Firm* — Wood Herron & Evans LLP

(57) ABSTRACT

The invention relates to a method for moving a wind turbine component, such as a wind turbine hub, from a transportation position to a wind turbine assembly position. The method comprises the steps of: attaching a handling unit to a structural part of the wind turbine component, operatively connecting the handling unit to a wire of a crane system, lifting the wind turbine component with the crane system to an assembly position of the wind turbine, the handling unit and the wind turbine component being suspended from a wire of the crane system, and rotating the wind turbine component with the handling unit during the lifting of the wind turbine component in order to orientate the wind turbine component for assembly. The invention also relates to a handling unit and a wind turbine hub and use hereof.

7 Claims, 7 Drawing Sheets

Related U.S. Application Data of application No. 12/524,329, filed as application No. PCT/DK2008/000028 on Jan. 24, 2008, now Pat. No. 8,403,620.

(51) Int. Cl.
*F03D 1/06* (2006.01)
*F03D 13/10* (2016.01)

(52) U.S. Cl.
CPC ......... *F05B 2230/60* (2013.01); *Y02E 10/721* (2013.01); *Y02E 10/726* (2013.01); *Y02E 10/728* (2013.01); *Y02P 70/523* (2015.11)

(58) Field of Classification Search
USPC .............................. 294/81.4, 67.5; 414/809
See application file for complete search history.

(56) References Cited

U.S. PATENT DOCUMENTS

| | | | | |
|---|---|---|---|---|
| 2008/0273986 | A1* | 11/2008 | Sakaue | F03D 1/0658 416/244 R |
| 2010/0043227 | A1* | 2/2010 | Numajiri | B66C 1/108 29/889 |
| 2013/0269188 | A1* | 10/2013 | Falkenberg | F03D 1/001 29/889.1 |
| 2014/0341742 | A1* | 11/2014 | Knoop | B66C 1/108 416/215 |

* cited by examiner

ASSEMBLY WITH HANDLING UNIT FOR MOVING A WIND TURBINE COMPONENT, SUCH AS A WIND TURBINE HUB, FROM A TRANSPORTATION POSITION TO A WIND TURBINE ASSEMBLY POSITION IN OR ON THE NACELLE, THE MAIN SHAFT OR THE HUB

CROSS-REFERENCE TO RELATED APPLICATIONS

The present application is a divisional of pending U.S. patent application Ser. No. 13/782,422 filed Mar. 1, 2013, which is a divisional of U.S. patent application Ser. No. 12/524,329 filed Jul. 23, 2009, now U.S. Pat. No. 8,403,620, which is a U.S. national phase application of PCT/DK2008/000028 filed Jan. 24, 2008, which designates the United States and claims priority to Danish Patent Application No. PA 2007/00106 filed Jan. 24, 2007. Each of these applications is incorporated by reference herein in its entirety.

FIELD OF THE INVENTION

The invention relates to a handling unit for moving a wind turbine component, such as a wind turbine hub, from a transportation position to a wind turbine assembly position.

DESCRIPTION OF RELATED ART

The erection of a modern wind turbine at a site usually involves complicated crane operation with a number of very tall cranes.

Especially, it is complicated to transport wind turbine components to the site and lift them into place at great height with cranes, e.g., assembling the wind turbine hub to the nacelle.

The very large and heavy steel hub needs to be transported in a vertical position with an assembly surface facing downward or alternatively to be reinforced and supported for a horizontal transportation position.

The hub is lifted off the transportation vehicle at the erection site by at least two very tall cranes in order to be moved from a vertical position to a horizontal position and lifted to the assembly position at the nacelle.

It may be difficult to get hold of numerous tall cranes at the same time, especially at the often rural and remote erection sites of modern wind turbines. Further, the crane use is also quite costly.

It is an object of the present invention to provide an advantageous method and apparatus for lifting a wind turbine component to a nacelle assembly position with fewer demands to the crane use.

SUMMARY OF THE INVENTION

The invention provides a method for moving a wind turbine component, such as a wind turbine hub, from a transportation position to a wind turbine assembly position, said method comprising the steps of: attaching a handling unit to a structural part of the wind turbine component, operatively connecting the handling unit to a wire of a crane system, lifting the wind turbine component with the crane system to an assembly position of the wind turbine, the handling unit and the wind turbine component being suspended from said wire, and rotating the wind turbine component with the handling unit during the lifting of the wind turbine component in order to orientate the wind turbine component for assembly.

By integrating the rotation step, it is possible to advantageously lift the wind turbine component to an assembly position with just one crane. The rotation is advantageously controlled by means of actuating means of the handling unit.

In one aspect of the invention, said wind turbine assembly position is a wind turbine assembly position in or on a nacelle a main shaft or a hub.

Most wind turbine components that need to be lifted and, possibly, rotated are placed within or in connection with the nacelle.

In one aspect of the invention, said handling unit is attached to at least two connection points of said structural part of the wind turbine component.

Using at least two separated connection points reduces the requirements to the strength of the construction compared to a situation with only one connection point.

In one aspect of the present invention, said handling unit is connected to an internal structural part of the wind turbine component through an opening in the wind turbine component. Hereby, it is possible to use an existing structural part of the wind turbine to perform the rotation of the wind turbine component, e.g., parts of the blade bearing in a wind turbine hub, instead of establishing a structural part only dedicated to the rotation of the component. Such additional external structures such as flanges on a wind turbine component may easily conflict with the normal functionality of the wind turbine component.

It should be noted that the term "blade bearing" also include the hub parts of a pitch bearing for a pitch controlled wind turbine.

In another aspect of the present invention, said handling unit actuates a rotating movement around a unit rotational centre and the crane system establishes linear movement.

In a further aspect of the present invention, said wind turbine component is lifted and rotated to an assembly position and subsequently assembled directly to a nacelle positioned on a wind turbine tower. Hereby, an advantageous embodiment of the invention is achieved.

In an even further aspect of the present invention, the rotation movement is a one-way controlled rotation of the wind turbine component. Hereby it is ensured that oscillations are not inflicted in the component during the lift by performing forward and reverse rotational movements.

In one aspect of the present invention, said actuating means rotates the wind turbine component during the lifting by a defined angle of 70 to 100 degrees and preferably between 80 and 90 degrees. Hereby it is ensured that the component arrives at the assembly position in the right angle and is instantly ready for assembly.

In another aspect of the present invention, at least the rotation movement of the handling unit is controlled by one or more remote control units, e.g., operated from the nacelle. Hereby it is ensured that the rotation movement may be performed from a safe distance by one or more operators.

In one aspect of the invention, the method comprises a step of transporting the wind turbine component to a wind turbine site on a transport vehicle before attaching the handling unit to the structural part of the wind turbine component, and the wind turbine component is lifted directly from the transport vehicle.

In another aspect of the invention, the method comprises the step of transporting the wind turbine component to a wind turbine site on a transport vehicle after attaching the handling unit to the structural part of the wind turbine component but before operatively connecting the handling unit to a wire of a crane system, and the wind turbine component is lifted directly from the transport vehicle.

Lifting the wind turbine component directly from a transport vehicle simplifies the operation compared to other methods, where the wind turbine component has to be removed from the transport vehicle before it can be attached to a crane system and lifted up.

In another aspect of the present invention, said component is a wind turbine hub, which is lifted and rotated with the crane system and handling unit from the transportation position having the assembly surface facing downward to an assembly position with the assembly surface facing the front of the nacelle.

The wind turbine hub has a structure and weight, which only allows it to be advantageously transported in a configuration different from the assembly position.

In one aspect of the invention, said component is a wind turbine hub, said structural part is the hub part of a blade bearing and said opening is a blade opening in the hub.

Mounting the handling unit onto the existing blade bearing is advantageous in that it eliminates the need of any special mounting arrangement on the wind turbine component, such as brackets.

The invention also relates to a handling unit for moving a wind turbine component, such as a wind turbine hub, from a transportation position to a wind turbine assembly position, said handling unit comprising at least one connection point for operatively connection to the wire of a crane system, attachment means, preferably comprising at least two attachment points, for attachment of the unit to a structural part of the wind turbine component, and actuating means actuating the wind turbine component around a unit rotational centre in order to perform the rotation of the wind turbine component of the method as described above in order to orientate the wind turbine component for assembly.

In an aspect of the present invention, said actuating means includes at least one actuator, such as hydraulic and/or electric actuators, at least one lever arm and a control system. The handling unit is attached to the wind turbine component in such a way that an even weight distribution is achieved at the lifting of the wind turbine component, i.e. the component may be rotated by only applying a little force, e.g., to a lever arm.

In another aspect of the present invention, said at least one actuator includes one or more hydraulic and one or more electric actuators. With the use of different types of actuators, it is possible to use one type such as the hydraulic actuator for the main part of the rotation and the electric actuator for the final exact adjustment of the position of the wind turbine component before attachment.

In an aspect of the present invention, said at least one actuator is powered by hand or motor operated hydraulic pump means and/or an electric generator or electric accumulator means. Hereby, an advantageous embodiment of the invention is achieved.

In another aspect of the present invention, said control system includes one or more remote control units, e.g., operated from the nacelle.

In another aspect of the present invention, the handling unit operational freedom is restricted to a defined rotation angle of 70 to 100 degrees and preferably between 80 and 90 degrees.

In a further aspect of the present invention, at least one of said lever arms is actuated by the actuating means to perform a scissor type of movement around the unit rotational centre.

Further, the invention relates to a wind turbine hub comprising at least one structural part for attaching a handling unit as described above.

In an aspect of the present invention, said hub comprises at least one opening and at least one internal structural part accessible for said handling unit through the opening.

The present invention also discloses the use of a handling unit as described above for lifting, rotating and attaching a wind turbine component, such as a wind turbine hub, gearbox or ring generator, to the wind turbine nacelle positioned on a wind turbine tower. Some wind turbine components, such as the hub, have a structure and weight which only allows it to be advantageously transported in a configuration different from the assembly position.

BRIEF DESCRIPTION OF THE DRAWINGS

The invention will be described in the following with reference to the figures, in which.

DETAILED DESCRIPTION OF THE DRAWINGS

Figure 1:
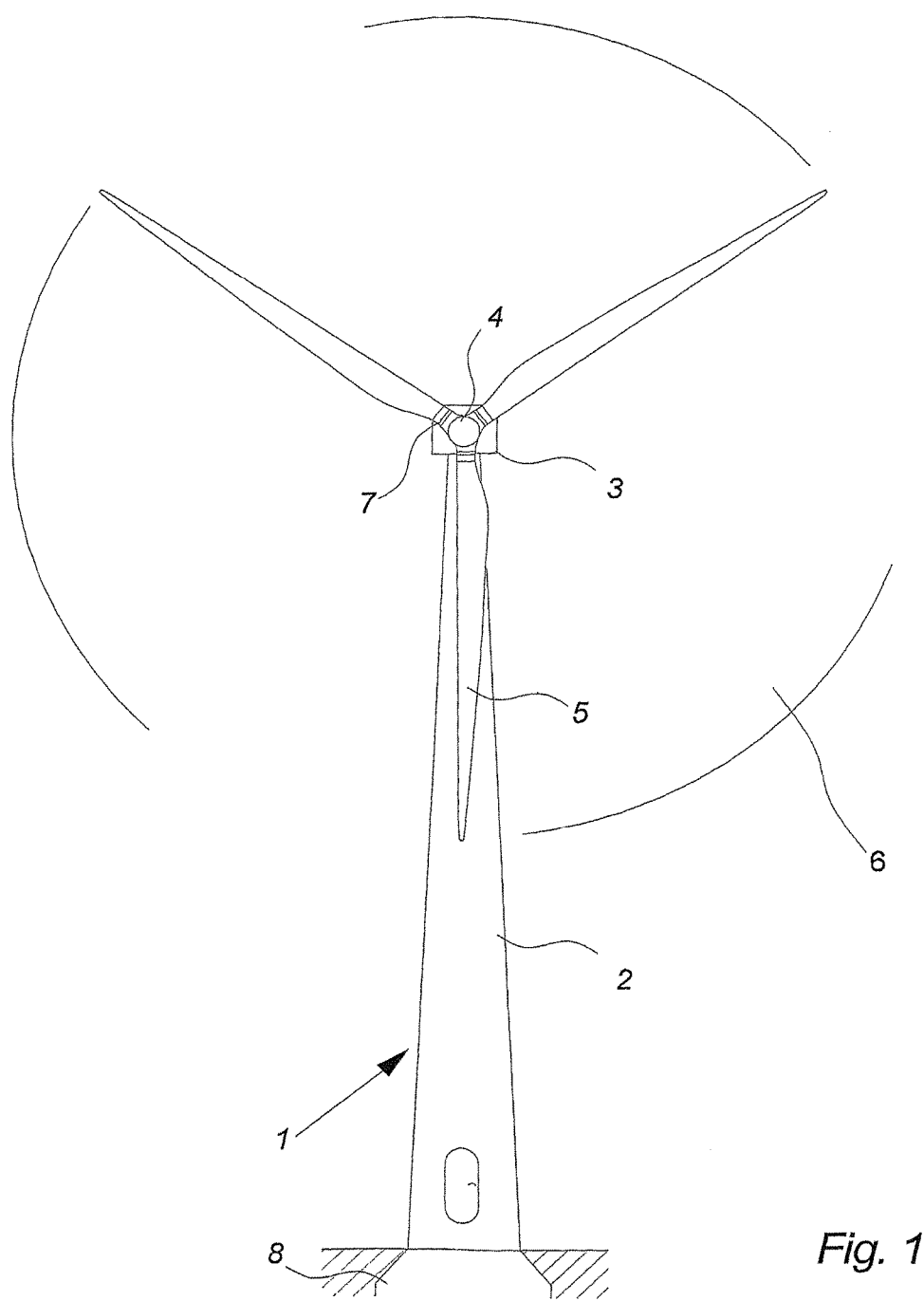
FIG. 1 illustrates a front view of a large modern wind turbine.

FIG. 1 illustrates a front view of a modern wind turbine 1 with a tower 2 positioned on a foundation 8. A wind turbine nacelle 3 and hub 4 is positioned on top of the tower.

The wind turbine rotor 6, comprising at least one wind turbine blade, such as three wind turbine blades 5 as illustrated, is connected to the wind turbine hub 4 through pitch mechanisms 7. Each pitch mechanism includes a blade bearing and pitch actuating means, which allows the blade to pitch.

Figure 2:
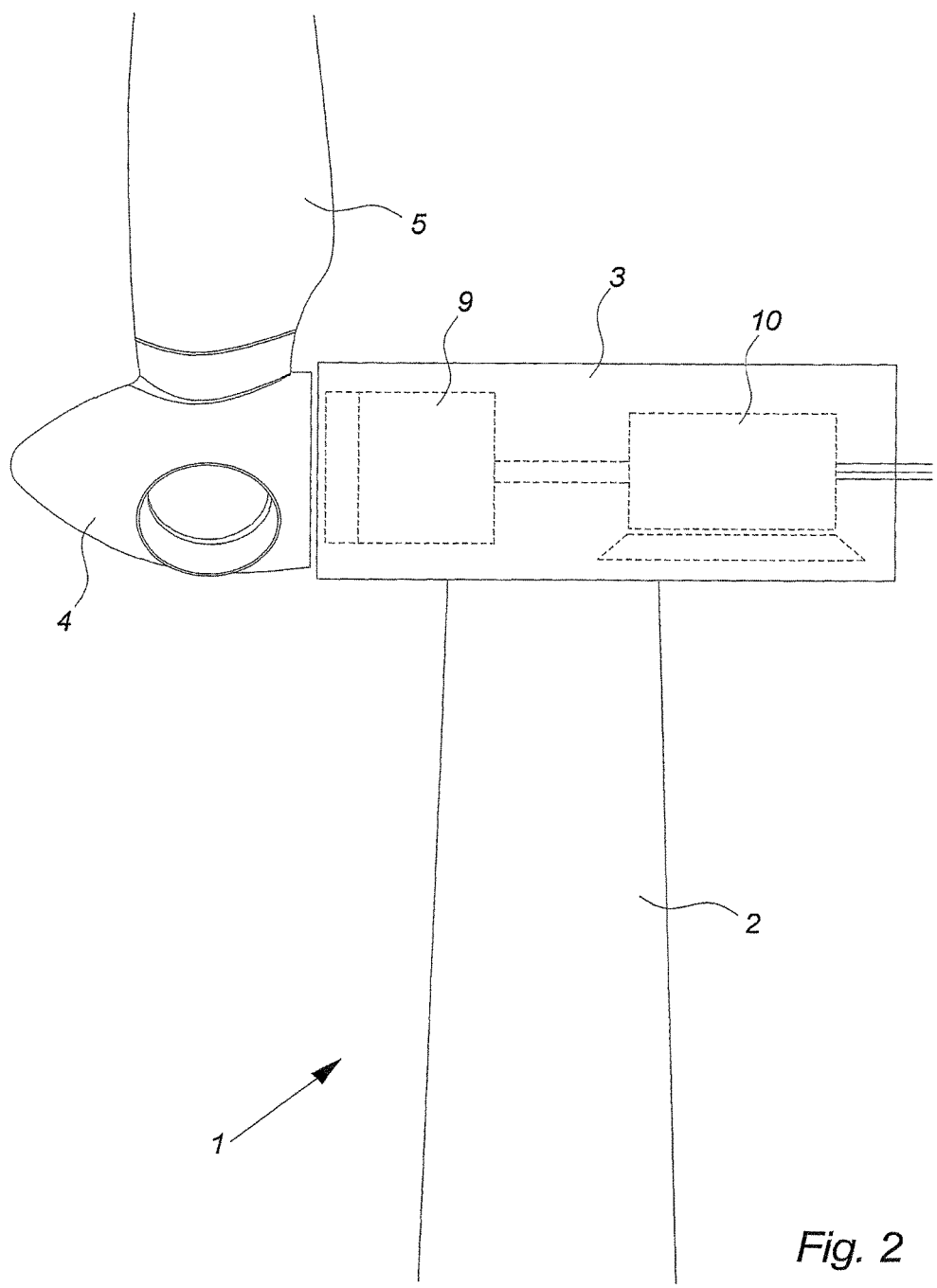
FIG. 2 illustrates schematically the wind turbine as seen from the side and with different wind turbine components.

FIG. 2 illustrates schematically the wind turbine seen from the side with different wind turbine components. Wind turbine components connected directly to the nacelle 3 include the wind turbine hub 4, the gearbox 9 and the generator 10 illustrated with an electric connection to a utility grid.

Figure 3:
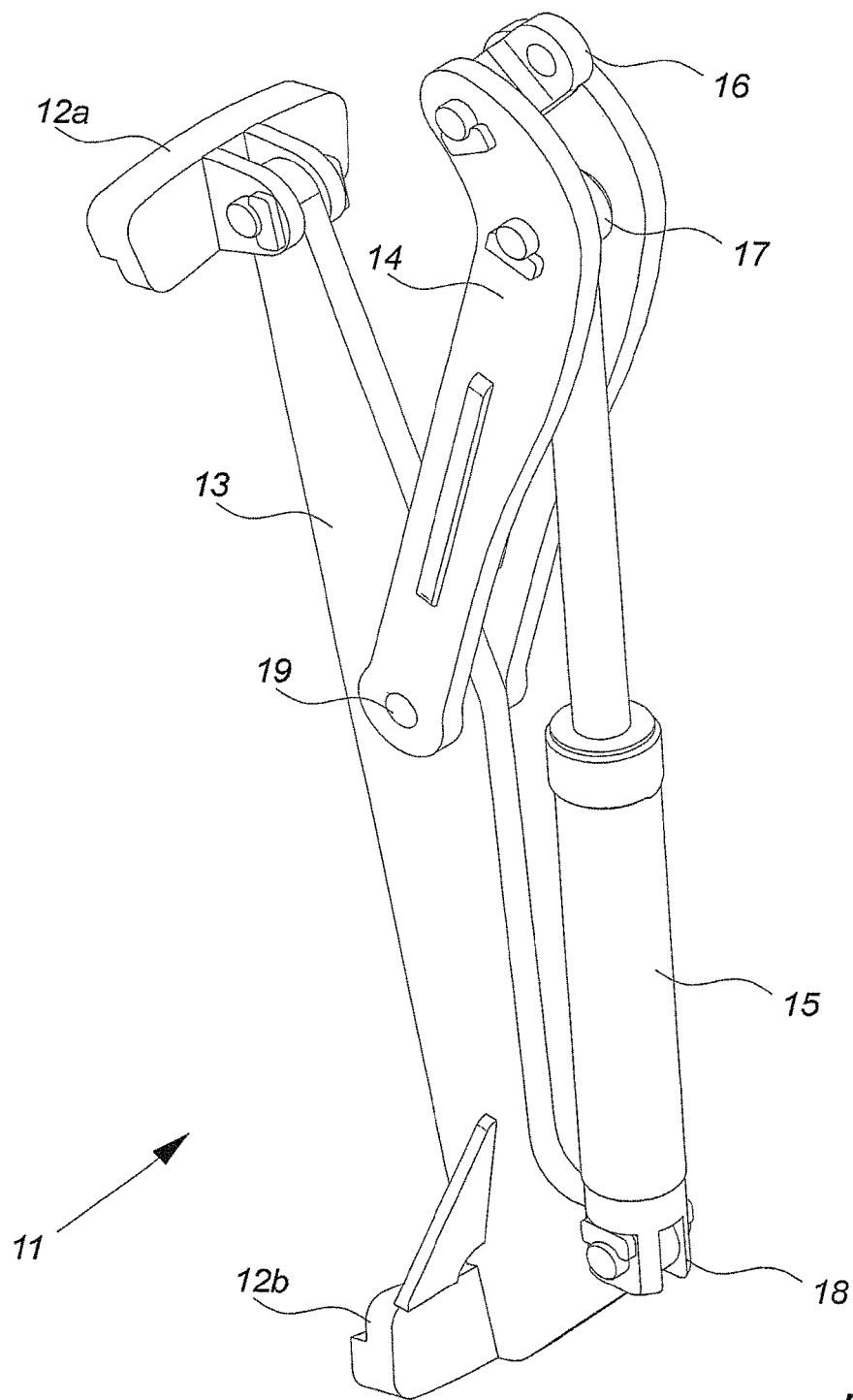
FIG. 3 illustrates a preferred embodiment of a handling unit according to the invention.

FIG. 3 illustrates a preferred embodiment of a handling unit 11 according to the invention.

The handling unit 11 includes first and second attachment points 12a, 12b for attachment to a structural part 22 of a wind turbine component. The attachment points 12a, 12b may be flanges with a number of holes allowing the unit to be bolted to the component in a fixed and rigid connection.

The first and second attachment points 12a, 12b are established on a fixed arm 13 of the handling unit 11. The fixed arm 13 also comprises a connection to a lever arm 14 connected to the fixed arm 13 in a rotational centre 19 of the handling unit 11.

An actuator 15 is connected to the fixed arm 13 and the lever arm 14 in connection points 17 and 18, i.e. connection point 17 for the actuator 15 to the lever arm 14 and connection point 18 for the actuator 15 to the fixed arm 13. The actuator 15 is preferably a hydraulic cylinder.

The actuator 15 and the arms 13, 14 allow the lever arm 14 to perform a controlled rotational movement around the rotational centre 19 of the unit. The lever arm 14 ends in a connection point 16, such as an eyelet, for a crane system. The crane system allows the handling unit 11 and the wind turbine component to be moved in linear directions, e.g., in a vertical and horizontal direction.

The handling unit 11 is preferably made in steel or a similar metal material with a high strength.

Figure 4A:
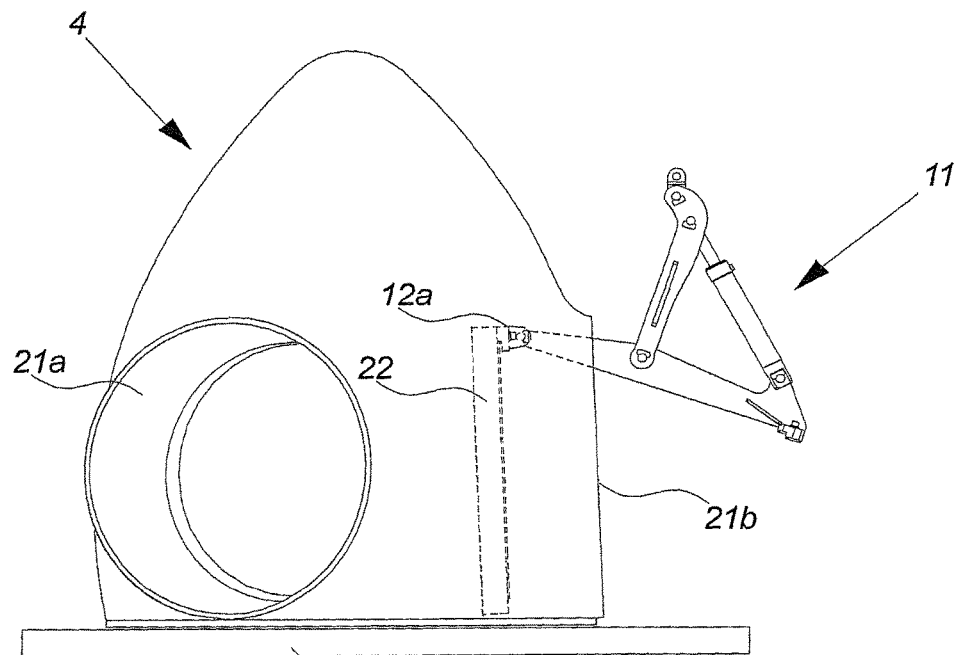
FIGS. 4a and 4b illustrate method steps of attaching the handling unit to a wind turbine component according to the invention.
Figure 4B:
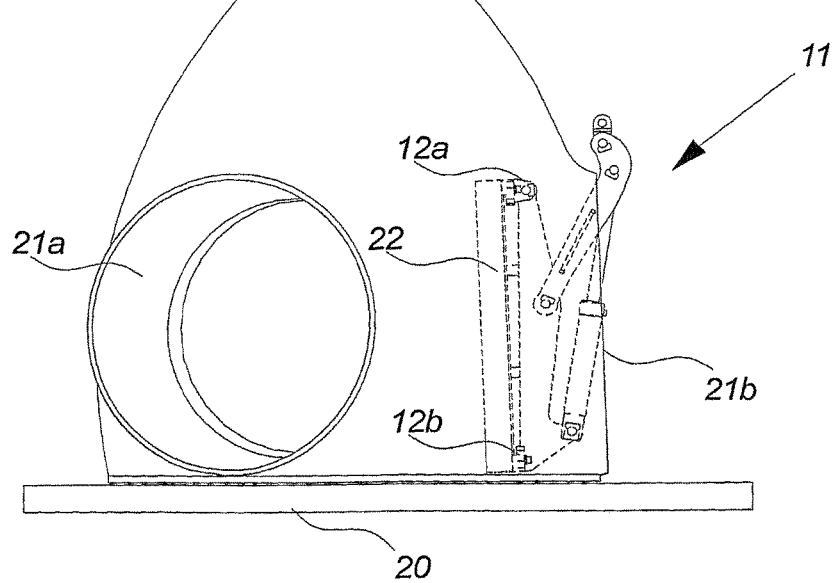

FIGS. 4a and 4b illustrate method steps of attaching the handling unit 11 to a wind turbine component according to the invention. The wind turbine component is illustrated as a wind turbine hub 4. The hub 4 is positioned on a section of a vehicle carrier surface 20, such as the platform of a truck. The transportation configuration includes the hub 4 standing in an upright, vertical, position with the assembly surface facing the carrier surface 20.

FIG. 4a illustrates the handling unit 11 attached to an internal structural part 22 of the hub 4 in a first attachment point 12a. The handling unit attachment to the internal structural part 22 is established through an opening 21b in the hub 4. The structural part 22 may be the hub part of a blade bearing, and the opening may be one of the blade openings in the hub 4.

The handling unit 11 may be suspended in a crane wire 24 during the attachment procedure (not illustrated in FIGS. 4a and 4b).

FIG. 4b illustrates the connection of the handling unit 11 in a second attachment point 12b to the structural part 22 by releasing the actuator 15.

Figure 5A:
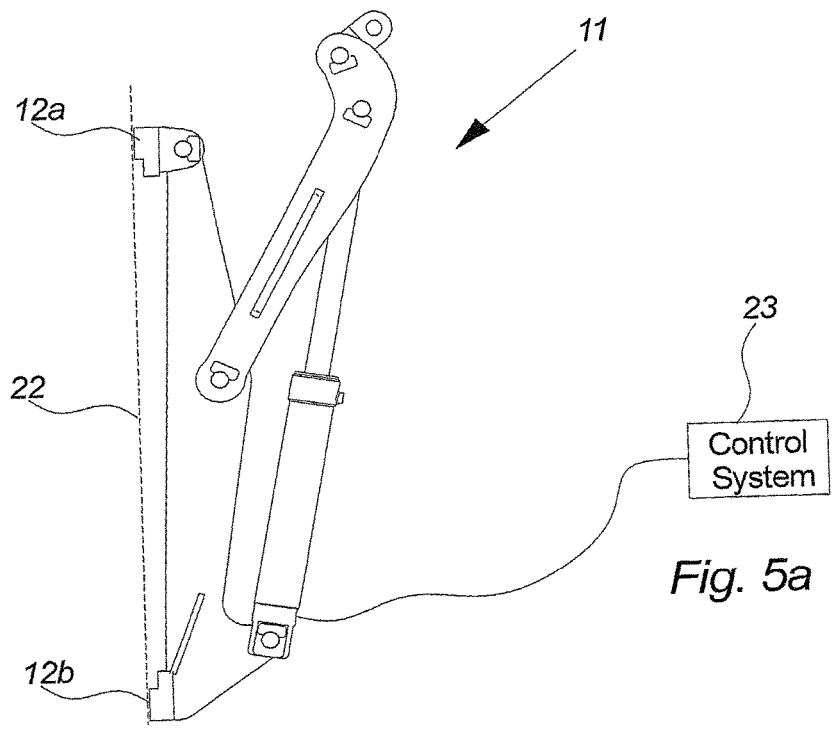
FIGS. 5a and 5b illustrate schematically the preferred embodiment of the handling unit according to the invention after attachment to a wind turbine component.
Figure 5B:
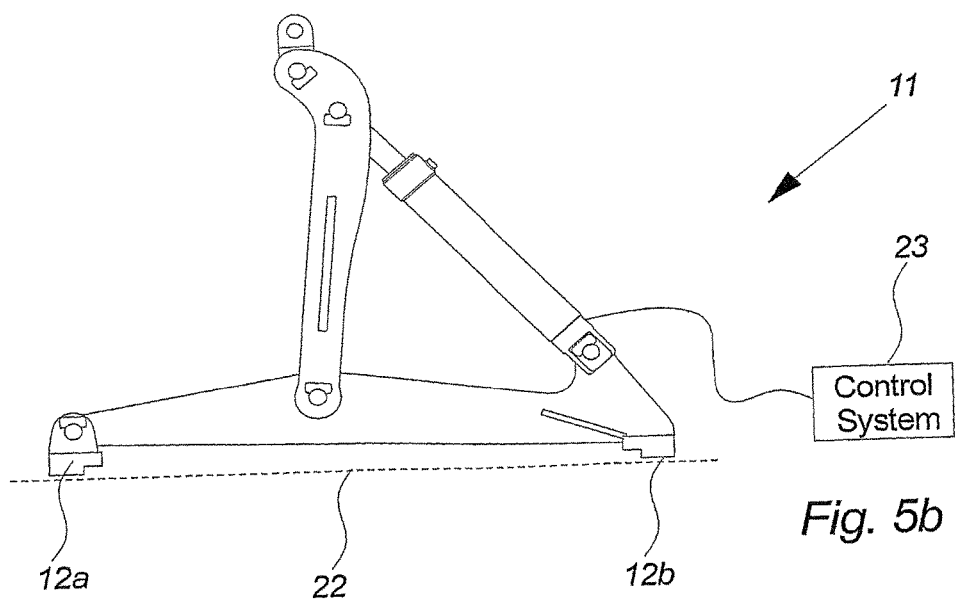

FIGS. 5a and 5b illustrate schematically the preferred embodiment of the handling unit 11 according to the invention after attachment to a wind turbine component. The figures further illustrate a control system 23 controlling the rotational movement of the wind turbine component.

FIG. 5a illustrates an initial position of the lifting and rotation of the wind turbine component. The control system may start the rotational movement after the component is lifted vertically and the necessary distance from a carrier surface 20 is established.

In a preferred embodiment of the invention, the actuator 15 is a hydraulic cylinder connected to a one-way valve and an expansion reservoir of the control system. The opening of the valve allows the hydraulic oil of the actuator 15 to be forced into the expansion reservoir in a controlled manner by the weight of the wind turbine component. This results in a slow piston rod movement into the cylinder 15 and a rotational movement of the wind turbine component until an end stop is reached. The end stop allows the rotational movement to be controlled within a range that ensures that the cylinder 15 is not emptied completely of hydraulic oil. The end stop also ensures that the wind turbine component is rotated a defined angle of, e.g., 70 to 100 degrees and preferably between 80 and 90 degrees before reaching an assembly position.

FIG. 5b illustrates the wind turbine component in a final, horizontal, position before assembly and with the hydraulic cylinder 15 with an almost retracted piston rod.

In another embodiment, the control system may comprise a two-way valve allowing the hydraulic oil to also be forced into the cylinder 15, e.g., with external power such as a hand operated pump.

FIGS. 6a to 6d illustrate the different method steps of attaching the handling unit 11 to the wind turbine component, the latter being illustrated as a wind turbine hub 4. Further, the steps of lifting and rotating the hub to an assembly position at the nacelle are illustrated in the figures.

Figure 6A:
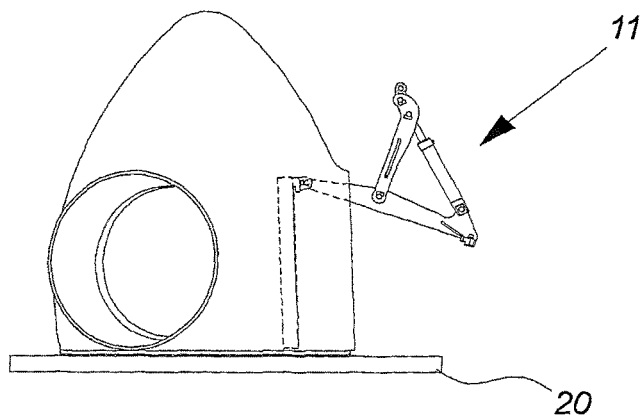
FIGS. 6a to 6d illustrate the different method steps of attaching the handling unit to the wind turbine component and, especially, lifting and rotating the component to an assembly position.
Figure 6B:
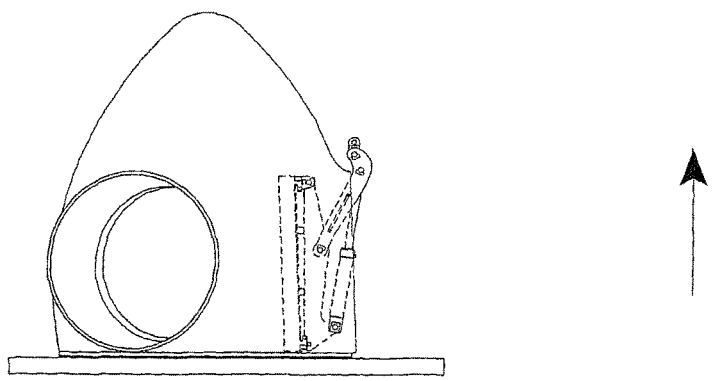

FIGS. 6a and 6b illustrate the mounting of the handling unit 11 on the hub 4 as explained in detail in the description of FIGS. 4a and 4b. FIG. 6b further illustrates the initial lifting force applied to the wind turbine component (symbolized with the straight line arrow).

Figure 6C:
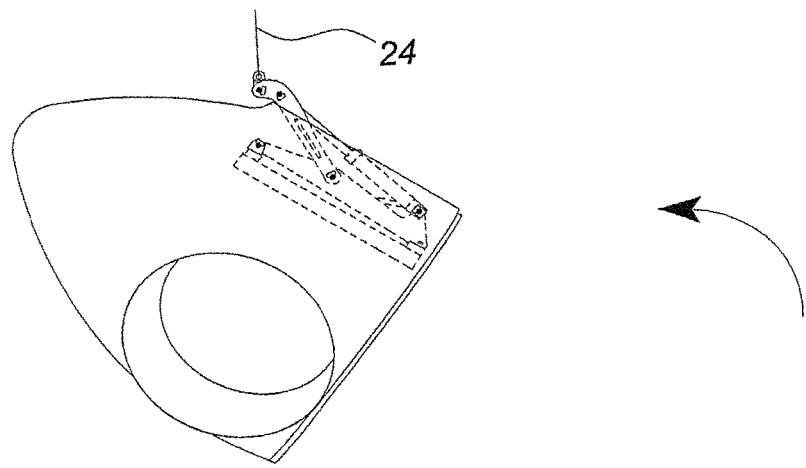

FIG. 6c illustrates the rotation of the wind turbine component performing the rotational movement by operating the control system (symbolized with the bend arrow).

Figure 6D:
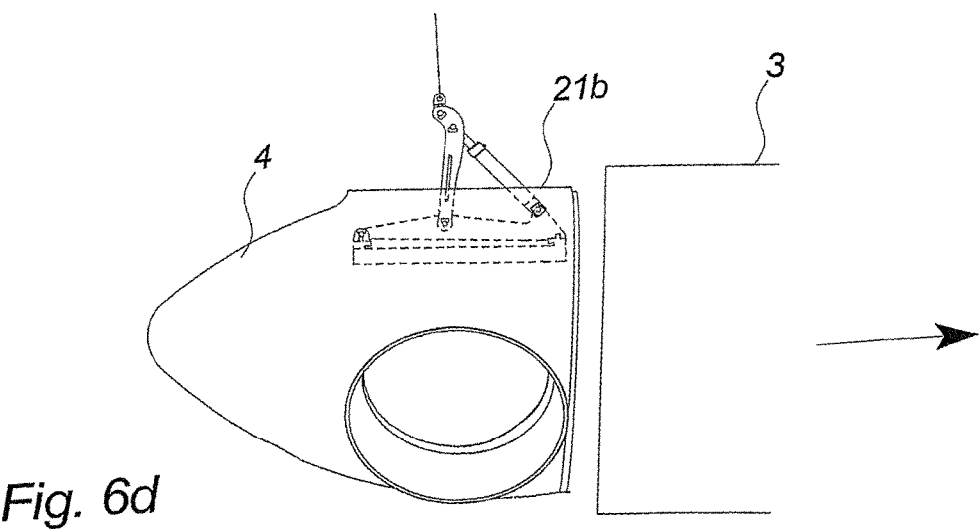

FIG. 6d illustrates the final position where the hub is ready for assembly to the front of the nacelle.

The invention described has been exemplified above with reference to specific examples of the handling unit. However, it should be understood that the invention is not limited to the particular examples but may be designed and altered in a multitude of varieties within the scope of the invention as specified in the claims, e.g., by use of electric driven actuators instead of hydraulic actuators. Even further, the invention may also be used to other wind turbine components, which may need rotation from a transportation position to a wind turbine assembly position at the nacelle, such as the wind turbine generator, e.g., a ring generator or gearbox, e.g., in connection with component replacement.

REFERENCE LIST

In the drawings the following reference numbers refer to:
1. Wind turbine
2. Wind turbine tower
3. Wind turbine nacelle
4. Wind turbine hub
5. Wind turbine blade
6. Wind turbine rotor with at least one blade
7. Blade pitch mechanism
8. Wind turbine foundation
9. Wind turbine gearbox
10. Wind turbine generator
11. Handling unit
12a, 12b. First and second attachment points for the handling unit
13. Fixed arm connected to the attachment points
14. Lever arm connected to the fixed arm
15. Actuator, such as a hydraulic actuator
16. Connection point for a crane system
17. Connection point for the actuator to the lever arm
18. Connection point for the actuator to the fixed arm
19. Rotational centre of the handling unit
20. Carrier surface of a transport vehicle
21a, 21b. Hub openings for wind turbine blades
22. Structural part, e.g., an internal hub structure, such as a part of the blade bearing
23. Control system for the actuating means, e.g., including a one- or two-way valve and an expansion reservoir
24. Wire of a crane system

What is claimed is:
1. An assembly for a wind turbine, comprising:
a wind turbine hub having a blade bearing; and
a handling unit attached to said wind turbine hub at said blade bearing, said handling unit for moving said wind turbine hub from a transportation position to a wind turbine assembly position, said handling unit comprising:
at least one connection point located outside said wind turbine hub and configured for connection to a wire of a crane system;

at least two attachment points configured for attachment to said wind turbine hub; and an actuator configured for actuating said wind turbine hub around a unit rotational centre in order to perform a rotation of said wind turbine hub from the transportation position to the wind turbine assembly position, said actuator operating to rotate said wind turbine hub while said actuator and said wind turbine hub are suspended with the wire of the crane system, wherein said at least two attachment points are directly attached to said blade bearing without any additional special mounting arrangement being coupled to said blade bearing.

2. The assembly of claim 1, wherein said at least two attachment points are spaced apart from one another so as to be configured for attachment to said wind turbine hub at two spaced apart locations.

3. The assembly of claim 2, wherein said actuator is spaced from said at least two attachment points and is configured to move relative to said at least two attachment points during rotation of said wind turbine hub.

4. The assembly of claim 3, wherein said actuator is configured to remain in a stationary position relative to said at least one connection point during movement relative to said at least two attachment points, thereby actuating rotational movement of said wind turbine hub relative to said at least one connection point.

5. The assembly of claim 1, wherein said at least two attachment points are directly attached to said blade bearing by bolting said handling unit to the blade bearing with bolt fasteners.

6. The assembly of claim 1, wherein the rotation of the wind turbine hub is restricted to a rotation angle of between 80 and 90 degrees.

7. The assembly of claim 1, wherein said actuator is spaced from said at least one connection point such that the wire of the crane system is spaced from said actuator during rotation of the wind turbine component.

\* \* \* \* \*